(12) United States Patent
Villamil

(10) Patent No.: US 12,440,504 B1
(45) Date of Patent: Oct. 14, 2025

(54) ENERGY DRINK COMPOSITION

(71) Applicant: Succo Holdings LLC, Jenks, OK (US)

(72) Inventor: Fernando Villamil, Jenks, OK (US)

(73) Assignee: Succo Holdings LLC, Jenks, OK (US)

( * ) Notice: Subject to any disclaimer, the term of this patent is extended or adjusted under 35 U.S.C. 154(b) by 0 days.

(21) Appl. No.: 18/940,954

(22) Filed: Nov. 8, 2024

(51) Int. Cl.
| | |
|---|---|
| A61K 31/7008 | (2006.01) |
| A23L 2/54 | (2006.01) |
| A61K 9/00 | (2006.01) |
| A61K 31/197 | (2006.01) |
| A61K 31/205 | (2006.01) |
| A61K 31/4415 | (2006.01) |
| A61K 31/455 | (2006.01) |
| A61K 31/714 | (2006.01) |
| A61K 31/726 | (2006.01) |
| A61K 31/737 | (2006.01) |
| A61K 36/258 | (2006.01) |
| A61K 36/26 | (2006.01) |
| A61K 36/9066 | (2006.01) |
| A61K 36/9068 | (2006.01) |
| A61K 38/06 | (2006.01) |

(52) U.S. Cl.
CPC ........... *A61K 31/7008* (2013.01); *A23L 2/54* (2013.01); *A61K 9/0095* (2013.01); *A61K 31/197* (2013.01); *A61K 31/205* (2013.01); *A61K 31/4415* (2013.01); *A61K 31/455* (2013.01); *A61K 31/714* (2013.01); *A61K 31/737* (2013.01); *A61K 36/26* (2013.01); *A61K 36/9068* (2013.01); *A61K 38/063* (2013.01)

(58) Field of Classification Search
None
See application file for complete search history.

(56) References Cited

U.S. PATENT DOCUMENTS

| | | | | |
|---|---|---|---|---|
| 5,364,845 A * | 11/1994 | Henderson | ............... | A61P 25/08 514/62 |
| 6,660,308 B1 * | 12/2003 | Martin | ............... | A23L 29/30 514/356 |
| 6,969,533 B1 * | 11/2005 | Martin | ............... | A61K 31/737 514/356 |
| 6,979,458 B1 * | 12/2005 | Martin | ............... | A61K 31/737 426/74 |
| 7,851,458 B2 * | 12/2010 | Stone | ............... | A23L 33/28 514/557 |
| 2003/0104107 A1 * | 6/2003 | Gillota | ............... | A23L 33/15 426/590 |
| 2003/0124200 A1 * | 7/2003 | Stone | ............... | A23L 33/17 424/600 |
| 2021/0386834 A1 * | 12/2021 | Lopez Velarde Luna | ............... | A61K 9/0019 |

FOREIGN PATENT DOCUMENTS

JP 05146279 A * 6/1993

OTHER PUBLICATIONS

Singh, U., S. Devaraj, and I. Jialal. "Vitamin E, oxidative stress, and inflammation." Annu. Rev. Nutr. 25.1 (2005): 151-174. (Year: 2005).*
"Rockstar Energy Drink: Products > Original Rockstar." Archived on Nov. 3, 2007 by the Wayback Machine.—Internet Archive—. https://web.archive.org/web/20071103154507/http://www.rockstar69.com/productIngredients.php?pdt=1 (Year: 2007).*
Higgins, John P., Troy D. Tuttle, and Christopher L. Higgins. "Energy beverages: content and safety." Mayo clinic proceedings. vol. 85. No. 11. Elsevier, 2010. (Year: 2010).*
Premavalli, K. S. "Ginger as a spice and flavorant." Ginger. CRC Press, 2016. 529-546. (Year: 2016).*
Grucza, Krzysztof, et al. "Effects of supplementation with glutathione and its precursors on athlete performance." Biomed J Sci & Tech Res 12.4 (2019). (Year: 2019).*
"Reed's Inc. Launches Really, Really, Really Real Ginger Ale." [Press Release] Globe Newswire (Apr. 1, 20205). (Year: 2020).*
Tireki, Suzan. "A review on packed non-alcoholic beverages: Ingredients, production, trends and future opportunities for functional product development." Trends in Food Science & Technology 112 (2021): 442-454. (Year: 2021).*

* cited by examiner

*Primary Examiner* — Bethany P Barham
*Assistant Examiner* — Peter Anthopolos
(74) *Attorney, Agent, or Firm* — Hall Estill Law Firm

(57) ABSTRACT

An energy drink composition to provide benefits to a person's joints, spine and invertebral discs. The energy drink composition includes water as a base solution. The energy drink composition also includes a first joint therapy component and a second joint therapy component. Additionally, the energy drink composition includes a first anti-inflammatory component and a second anti-inflammatory component.

12 Claims, No Drawings

ENERGY DRINK COMPOSITION

STATEMENT REGARDING FEDERALLY SPONSORED RESEARCH OR DEVELOPMENT

Not applicable.

CROSS-REFERENCE TO RELATED APPLICATIONS

Not applicable.

BACKGROUND OF THE DISCLOSURE

1. Field of the Invention

The present disclosure relates to an energy drink composition that provides benefits for a person's joints, spine and invertebral discs who consumes the energy drink composition.

2. Description of the Related Art

There are numerous types of energy drinks touting various side benefits. Examples of these benefits include, but are not limited to, enhanced alertness, improved mood or attitude, a boosted performance in workouts, etc. Typical energy drinks do not provide any specific physical benefits to the consumers.

Accordingly, there is a need for an energy drink composition that can cause specific physical benefits to the consumers.

SUMMARY OF THE DISCLOSURE

The present disclosure is directed to an energy drink composition to provide benefits to a person's joints, spine and invertebral discs. The energy drink composition includes water as a base solution. The energy drink composition also includes a first joint therapy component and a second joint therapy component. Additionally, the energy drink composition includes a first anti-inflammatory component and a second anti-inflammatory component.

DETAILED DESCRIPTION OF THE DISCLOSURE

The present disclosure is directed to an energy drink composition that can provide specific physical benefits to the consumers who drink the energy drink composition. More specifically, the physical benefits of the energy drink composition are related to benefits for a person's joints, spine and invertebral discs. The energy drink composition can include various ingredients in varying amounts to provide the benefits discussed herein. The ingredients included at varying amounts can provide various benefits to the joints, spine and invertebral discs. The ingredients of the energy drink composition can be combined with water, still and/or carbonated, to create the energy drink composition in a beverage form for consumption.

In one exemplary embodiment, the energy drink composition can be made by mixing the ingredients with a certain amount of water, still and/or carbonated, to create a desired volume of the energy drink composition. In one embodiment, the water of the energy drink composition can account for approximately 98.55% by volume of the energy drink composition. In another embodiment, the water of the energy drink composition can account for approximately between about 90% by volume and about 99% by volume of the energy drink composition. In a further embodiment, the water of the energy drink composition can account for approximately between about 97% by volume and about 98.8% by volume of the energy drink composition. In yet another embodiment, the water of the energy drink composition can account for approximately between about 98.25% by volume and about 98.7% by volume of the energy drink composition. In an even further embodiment, the water of the energy drink composition can account for approximately between about 98.5% by volume and about 98.6% by volume of the energy drink composition.

In one embodiment of the present disclosure, carbonated water can be added to the energy drink composition to create a carbonated beverage. The carbonation can be injected into the energy drink composition at a certain volume to create the desired level of carbonation of the energy drink composition. In one embodiment, the carbonation can be injected into the energy drink composition to cause the energy drink composition to have a carbonation volume of about 1.75% by volume of the energy drink composition to about 3.0% by volume of the energy drink composition. In another embodiment, the carbonation can be injected into the energy drink composition to cause the energy drink composition to have a carbonation volume of about 2% by volume of the energy drink composition to about 2.75% by volume of the energy drink composition. In a further embodiment, the carbonation can be injected into the energy drink composition to cause the energy drink composition to have a carbonation volume of about 2.1% by volume of the energy drink composition to about 2.5% by volume of the energy drink composition. In yet another embodiment, the carbonation can be injected into the energy drink composition to cause the energy drink composition to have a carbonation volume of about 2.3% by volume of the energy drink composition.

The energy drink composition can include a first joint therapy component to provide pain relief benefits to joints and provide preventative benefits to the joints of the consumers of the energy drink composition. The first joint therapy component can be any material known by one of ordinary skill in the art for providing these benefits to joints. In one exemplary embodiment, the first joint therapy component can be glucosamine. The amount of the first joint therapy component included in the energy drink composition can be any amount such that the desired benefits are achieved. In one embodiment, the first joint therapy component can be included in the energy drink composition in an amount of at least 1500 mg. In another embodiment, the first joint therapy component can be included in the energy drink composition in an amount in a range of 1500 mg to about 3000 mg. In a further embodiment, the first joint therapy component can be included in the energy drink composition in an amount in a range of 1500 mg to about 2250 mg. In yet another embodiment, the first joint therapy component can be included in the energy drink composition in an amount in a range of 1500 mg to about 1750 mg.

The energy drink composition can include a second joint therapy component to provide additional pain relief benefits to joints and provide additional preventative benefits to the joints of the consumers of the energy drink composition. Similar to the first joint therapy component, the second joint therapy component can be any material known by one of ordinary skill in the art for providing these benefits to joints. In one exemplary embodiment, the second joint therapy component can be a chondroitin containing material. In another embodiment, the second joint therapy component can be chondroitin. The amount of the second joint therapy component included in the energy drink composition can be any amount such that the desired benefits are achieved. In one embodiment, the second joint therapy component can be included in the energy drink composition in an amount of at least 200 mg. In another embodiment, the second joint therapy component can be included in the energy drink composition in an amount in a range of 400 mg to about 1200 mg. In a further embodiment, the second joint therapy component can be included in the energy drink composition in an amount in a range of 600 mg to about 1200 mg. In yet another embodiment, the second joint therapy component can be included in the energy drink composition in an amount in a range of 800 mg to about 1200 mg. In an even further embodiment, the second joint therapy component can be included in the energy drink composition in an amount in a range of 1000 mg to about 1200 mg.

The energy drink composition can include a first anti-inflammatory component to provide anti-inflammatory benefits to the joints of the consumers of the energy drink composition. The first anti-inflammatory component can be any material known by one of ordinary skill in the art for providing these benefits to joints. In one exemplary embodiment, the first anti-inflammatory component can be ginseng. The amount of the first anti-inflammatory component included in the energy drink composition can be any amount such that the desired benefits are achieved. In one embodiment, the first anti-inflammatory component can be included in the energy drink composition in an amount of about 100 mg to about 3000 mg. In another embodiment, the first anti-inflammatory component can be included in the energy drink composition in an amount in a range of about 200 mg to about 2000 mg. In a further embodiment, the first anti-inflammatory component can be included in the energy drink composition in an amount in a range of about 300 mg to about 1000 mg. In yet another embodiment, the first anti-inflammatory component can be included in the energy drink composition in an amount in a range of 350 mg to about 450 mg.

The energy drink composition can include a second anti-inflammatory component to provide anti-inflammatory benefits to the joints of the consumers of the energy drink composition. The second anti-inflammatory component can be any material known by one of ordinary skill in the art for providing these benefits to joints. In one exemplary embodiment, the second anti-inflammatory component can be ginger. The amount of the second anti-inflammatory component included in the energy drink composition can be any amount such that the desired benefits are achieved. In one embodiment, the second anti-inflammatory component can be included in the energy drink composition in an amount greater than about 1000 mg. In another embodiment, the second anti-inflammatory component can be included in the energy drink composition in an amount in a range of about 1000 mg to about 4000 mg. In a further embodiment, the second anti-inflammatory component can be included in the energy drink composition in an amount in a range of about 1000 mg to about 3000 mg. In yet another embodiment, the second anti-inflammatory component can be included in the energy drink composition in an amount in a range of 1000 mg to about 2000 mg.

The energy drink composition can include an amino acid to provide energy production of the consumers of the energy drink composition. The amino acid can be any material known by one of ordinary skill in the art for providing the energy production desired. In one exemplary embodiment, the amino acid can be taurine. The amount of the amino acid included in the energy drink composition can be any amount such that the desired benefits are achieved. In one embodiment, the amino acid can be included in the energy drink composition in an amount of about 500 mg to about 2000 mg. In another embodiment, the amino acid can be included in the energy drink composition in an amount in a range of about 600 mg to about 1500 mg. In a further embodiment, the amino acid can be included in the energy drink composition in an amount in a range of about 800 mg to about 1200 mg. In yet another embodiment, the amino acid can be included in the energy drink composition in an amount of about 900 mg to about 1100 mg.

The energy drink composition can include an antioxidant to provide a reduction in oxidative stress. The antioxidant can be any material known by one of ordinary skill in the art for providing these benefits. In one exemplary embodiment, the antioxidant can be glutathione. The amount of the antioxidant included in the energy drink composition can be any amount such that the desired benefits are achieved. In one embodiment, the antioxidant can be included in the energy drink composition in an amount of about 200 mg to about 500 mg. In another embodiment, the antioxidant can be included in the energy drink composition in an amount in a range of about 250 mg to about 400 mg. In a further embodiment, the antioxidant can be included in the energy drink composition in an amount in a range of about 250 mg to about 300 mg.

The energy drink composition can include additional components that provide certain physiological benefits. One example is turmeric. The energy drink composition can include turmeric in an amount in a range of about 1500 mg to about 2500 mg. In another embodiment, the energy drink composition can include turmeric in an amount in a range of about 1750 mg to about 2250 mg. In a further embodiment, the energy drink composition can include turmeric in an amount in a range of about 1900 mg to about 2100 mg. In yet another embodiment, the energy drink composition can include turmeric in an amount of about 1000 mg.

The energy drink composition can also include various vitamin B compounds to provide various benefits to the consumer of the energy drink composition. For example, the energy drink composition can include, but is not limited to, vitamin B6, vitamin B3, vitamin B5 and vitamin B12. Vitamin B6 can provide brain development benefits as well as helping to keep the nervous and immune systems healthy. Vitamin B3 can provide benefits for the nervous system, digestive system and the skin. Vitamin B5 can help manufacture red blood cells and helps break down fats and carbohydrates for energy. Vitamin B12 can provide benefits for the nerves of the consumer of the energy drink composition.

The amount of vitamin B6 included in the energy drink composition in any amount such that the energy drink composition has the desired qualities. In one embodiment, the vitamin B6 can be included in the energy drink composition in a range of about 1.3 mg to about 5 mg. In another embodiment, the vitamin B6 can be included in the energy drink composition in a range of about 3.5 mg to about 4.5 mg. In a further embodiment, the vitamin B6 can be included in the energy drink composition in a range of about 4.1 mg to about 4.4 mg. In an even further embodiment, the vitamin B6 can be included in the energy drink composition in an amount of about 4.25 mg.

The amount of vitamin B3 included in the energy drink composition in any amount such that the energy drink composition has the desired qualities. In one embodiment, the vitamin B3 can be included in the energy drink composition in a range of about 10 mg to about 35 mg. In another embodiment, the vitamin B3 can be included in the energy drink composition in a range of about 10 mg to about 20 mg. In a further embodiment, the vitamin B3 can be included in the energy drink composition in a range of about 14 mg to about 18 mg. In yet another embodiment, the vitamin B3 can be included in the energy drink composition in an amount of about 16 mg.

The amount of vitamin B5 included in the energy drink composition in any amount such that the energy drink composition has the desired qualities. In one embodiment, the vitamin B5 can be included in the energy drink composition can be less than about 10 mg. In another embodiment, the vitamin B5 can be included in the energy drink composition in a range of about 1 mg to about 7.5 mg. In a further embodiment, the vitamin B5 can be included in the energy drink composition in a range of about 1 mg to about 5 mg. In an even further embodiment, the vitamin B5 can be included in the energy drink composition in a range of about 2 mg to about 3 mg. In yet an even further embodiment, the vitamin B5 can be included in the energy drink composition in an amount of about 2.5 mg.

The amount of vitamin B12 included in the energy drink composition in any amount such that the energy drink composition has the desired qualities. In one embodiment, the vitamin B12 can be included in the energy drink composition in a range of about 2.4 mcg to about 5,000 mcg. In another embodiment, the vitamin B12 can be included in the energy drink composition in a range of about 1500 mcg to about 5000 mcg. In a further embodiment, the vitamin B12 can be included in the energy drink composition in a range of about 3000 mcg to about 5000 mcg. In yet another embodiment, the vitamin B12 can be included in the energy drink composition in a range of about 4500 mcg to about 5000 mcg. In yet a further embodiment, the vitamin B12 can be included in the energy drink composition in an amount of about 5000 mcg.

In one exemplary embodiment, the energy drink composition can include only water or carbonated water, glucosamine, a chondroitin containing material or chondroitin, ginseng, ginger, turmeric, taurine, and a mixture of vitamin B compounds. In another exemplary embodiment, the vitamin B compounds can only be vitamin B6, vitamin B3, vitamin B5 and vitamin B12.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. An energy drink composition to provide benefits to a person's joints, spine and invertebral discs, the composition consisting of:
   water and carbonated water;
   glucosamine;
   chondroitin and/or a chondroitin containing material as a joint therapy component;
   ginseng;
   ginger;
   turmeric;
   taurine; and
   a mixture of vitamin B compounds.

2. The energy drink composition of claim 1 wherein the mixture of vitamin B compounds include vitamin B6, vitamin B3, vitamin B5 and vitamin B12.

3. The energy drink composition of claim 1 wherein the taurine is present in the energy drink composition in an amount in a range of about 500 mg to about 2000 mg.

4. The energy drink composition of claim 1 wherein the glucosamine is present in the energy drink composition in an amount in a range of about 1500 mg to about 3000 mg.

5. The energy drink composition of claim 1 wherein the ginseng is present in the energy drink composition in an amount in a range of about 100 mg to about 3000 mg and the ginger is present in the energy drink composition in an amount in a range of about 1000 mg to about 4000 mg.

6. The energy drink composition of claim 2 wherein the vitamin B6 is present in the energy drink composition in an amount in a range of about 1.3 mg to about 1.7 mg and the vitamin B3 is present in the energy drink composition in an amount in a range of about 10 mg to about 35 mg.

7. The energy drink composition of claim 2 wherein the vitamin B5 is present in the energy drink composition in an amount of less than about 10 mg and the vitamin B12 is present in the energy drink composition in an amount in a range of about 2.4 mcg to about 5000 mcg.

8. The energy drink composition of claim 1 wherein the water is included in the energy drink composition in an amount in a range of about 90% to about 99% by volume of the volume of the energy drink composition.

9. The energy drink composition of claim 1 wherein carbonation is included in the energy drink composition in an amount in a range of about 1.75% to about 3.0% by volume of the volume of the energy drink composition.

10. The energy drink composition of claim 1 wherein the turmeric is present in the energy drink composition in an amount in a range of about 1000 mg to about 2500 mg.

11. The energy drink composition of claim 1 wherein the ginger is present in the energy drink composition in an amount in a range of about 1000 mg to about 4000 mg.

12. The energy drink composition of claim 1 wherein the joint therapy component is present in the energy drink composition in an amount in a range of about 200 mg to about 1200 mg.

* * * * *